(12) United States Patent
Davey-Rogers

(10) Patent No.: US 10,535,074 B2
(45) Date of Patent: Jan. 14, 2020

(54) METHOD AND SYSTEM FOR INDEXING OF AGRICULTURAL REGIONS

(71) Applicant: MasterCard International Incorporated, Purchase, NY (US)

(72) Inventor: Nadine Davey-Rogers, Miami Shores, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 778 days.

(21) Appl. No.: 15/200,285

(22) Filed: Jul. 1, 2016

(65) Prior Publication Data

US 2018/0005255 A1 Jan. 4, 2018

(51) Int. Cl.
*G06Q 30/02* (2012.01)
*G06Q 40/02* (2012.01)

(52) U.S. Cl.
CPC ....... *G06Q 30/0205* (2013.01); *G06Q 40/025* (2013.01)

(58) Field of Classification Search
CPC .............................. G06Q 10/00; G06Q 40/00
USPC ............................................... 705/7.34, 7.29
See application file for complete search history.

(56) References Cited

U.S. PATENT DOCUMENTS

| | | | | |
|---|---|---|---|---|
| 5,521,813 A * | 5/1996 | Fox | ......... | G06Q 10/06 705/7.29 |
| 6,584,447 B1 * | 6/2003 | Fox | ......... | G06Q 10/06 705/7.31 |
| 2008/0288417 A1 * | 11/2008 | Luessi | ......... | G06Q 40/06 705/36 R |
| 2009/0210353 A1 * | 8/2009 | Mitchell | ......... | G01W 1/10 705/36 R |
| 2010/0042527 A1 * | 2/2010 | Mitchell | ......... | G01W 1/10 705/35 |
| 2013/0282541 A1 * | 10/2013 | Greiner | ......... | G06Q 30/04 705/34 |
| 2015/0032602 A1 * | 1/2015 | Blackhurst | ......... | G06Q 40/02 705/39 |
| 2015/0242970 A1 * | 8/2015 | Avey | ......... | G06Q 50/163 705/314 |
| 2016/0055431 A1 * | 2/2016 | Howe | ......... | G06Q 10/025 705/6 |
| 2016/0086284 A1 * | 3/2016 | Ghosh | ......... | G06Q 40/08 705/4 |

* cited by examiner

*Primary Examiner* — Romain Jeanty
(74) *Attorney, Agent, or Firm* — Buchanan Ingersoll & Rooney PC

(57) ABSTRACT

A method for indexing economic impact of weather events is described. The method includes storing transaction data regarding payment transactions made by customers in a geographic area, receiving weather information regarding weather events in a time period, identifying transaction data related to the weather information, calculating an index value that indicates the economic impacts of the weather events based on the identified transaction data and the weather information.

20 Claims, 9 Drawing Sheets

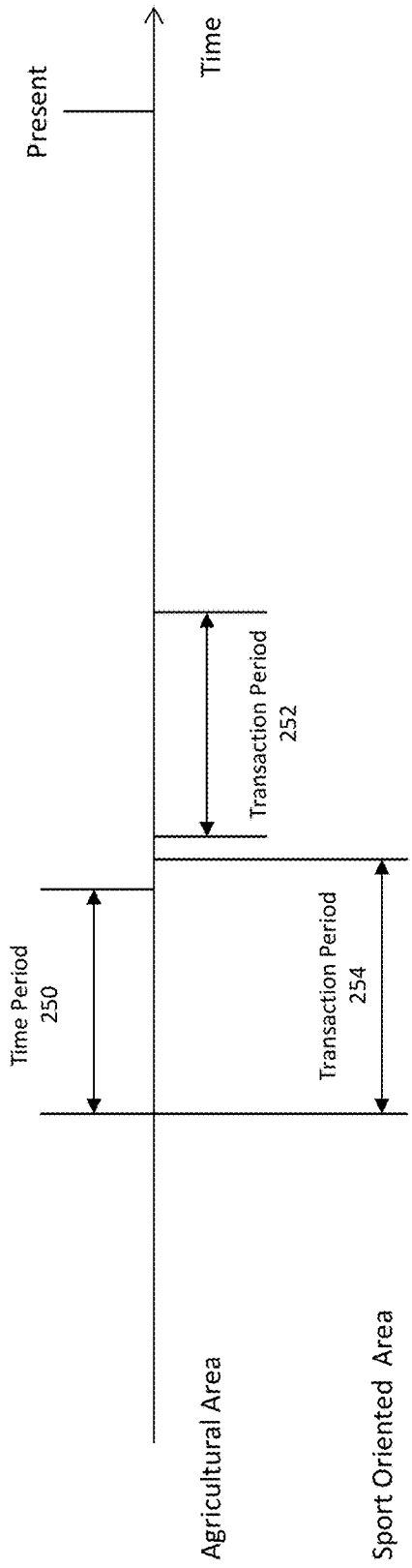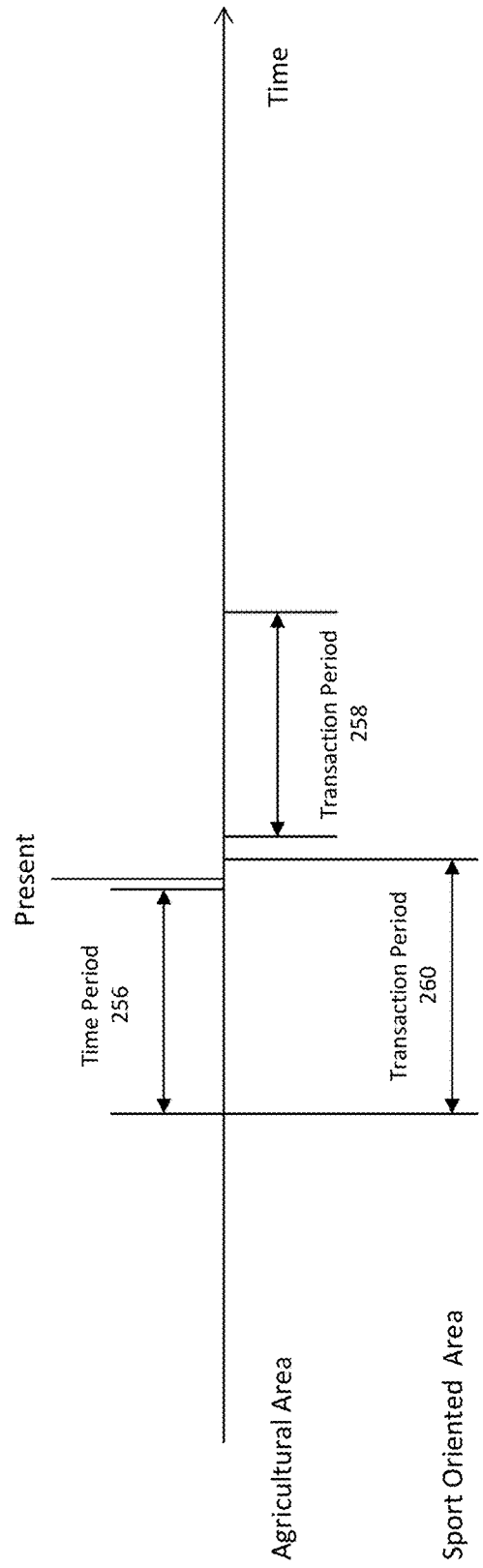

METHOD AND SYSTEM FOR INDEXING OF AGRICULTURAL REGIONS

FIELD

The present disclosure relates to indexing economic impact of weather events, for instance in markets dependent on agriculture, based on weather data, demographical data and transaction data.

BACKGROUND

Weather can have a significant impact on local economies, and sometimes different impacts on segments of the same economy. For instance, major weather events such as hurricanes and tornados can have a powerful negative impact on a devastated economy, but normal weather trends and variances can have a marked impact as well. For instance, greater than or less than normal rain fall or temperatures can effect crop yields and effect participation in outdoor activities, and businesses directed tied to these activities will be effected. Additionally, other businesses can be affected by the secondary effects of a strengthened or weakened economy. Understanding these direct and secondary effects is a labor intensive, often less than accurate and costly effort involving multiple sources, disparate computer systems, costly economic and weather models and a deep understanding of the local businesses, as well as the interconnections and interrelatedness of businesses. In the end, it is often the gut feeling of people long experienced in a local or larger economy who can explain the impact of weather of a limited market or local economy by under qualified indicators, such as simply saying the economy is or is going to be "strong" or "weak" based on experience rather than solid numbers or analytics. Further, the resulting analysis of more quantitative analysis may not be readily understandable to many participants in an economy that might be benefited by such knowledge without significant training.

Further, such significant efforts of obtaining the expertise, conducting the analysis and educating those who could benefit in interpreting the results from such insights cannot be justified or are unavailable though these insights could be of great value. This is particularly evident for medium to small businesses and those that serve them. For instance, small lending institutions in rural communities lack such resources. As a more extreme example, institutions that provide micro-financing require a business model that has very low transaction costs. This often means employing relatively low skilled, low cost employees, using simple business arrangements and adopting readily understood criteria for determining what a given transaction's parameters (e.g., interest rates, payback period, collateral, etc.) should be. Micro-finance customers located in rural and heavily agricultural geographies who rely upon agriculture for income are usually directly affected by weather, which can impact their ability and timing of their repayments for a given growing season. For example, snow storms may have impact on the crop yield of the next year, the crop price, the annual income of the micro-finance customers, and eventually their ability to timely repay the interest and/or the principal of the loans. Lenders of such loans, therefore, may need to manage the loan to ensure the repayment by adjusting loan parameters and/or proactively intervening before the micro-finance customer defaults.

As such, there is a need for a technical solution to provide an efficient analysis of a vast amount of transaction data, weather data, and demographic data to calculate an index value to indicate the impact of weather on the financial conditions of an economy or market and the participants therein.

SUMMARY

The present disclosure provides a description of systems and methods for indexing economic impact of weather events. Such an index can be useful in any size economy for any size geography, but is particularly useful in situations wherein a simple measure is appropriate (e.g., for everything from low cost microloans to gauging the strength of a given economy or market at a macro level). This system and method is based in part on the insight of the present inventor that an index can be derived from transaction data, such as from payment card transactions, as correlated to weather data, and can be optionally refined using demographic data of participants in a given economy.

For example, a method for indexing economic impact of weather events may comprise: storing, in a transaction database of a processing server, a plurality of transaction data entries, wherein each transaction data entry is a structured data set including data related to an electronic payment transaction including at least a geographic location, a time and/or date, and transaction content data; receiving, by a receiving device of the processing server, a data signal superimposed with weather data, wherein the weather data includes at least weather information for a geographic area for a plurality of time periods; executing, by a querying module of the processing server, a query on the transaction database to identify a subset of transaction data entries where each transaction data entry in the subset includes a time and/or date included one or more transaction time periods respectively corresponding to the respective time period and where the geographic location included in each transaction data entry in the subset is included in the geographic area; identifying, by an analytical module of the processing server, one or more purchase behaviors for each of the transaction time periods based on at least the transaction content data included in each transaction data entry in the subset of transaction data entries identified for the transaction time periods; and identifying, by an indexing module of the processing server, an index value associated with the geographic area indicative of an economic impact of weather events on the geographic area based on at least changes in the weather information for the geographic area over the plurality of time periods and changes in the corresponding one or more purchase behaviors over the transaction time periods.

As another example, a method for estimating economic impact based on weather, may comprise: storing, in a transaction database of a processing server, a plurality of transaction data entries, wherein each transaction data entry is a structured data set including data related to an electronic payment transaction including at least a geographic location, a time and/or date, and transaction content data; storing, in an index database of the processing server, a plurality of index values, wherein each index value is associated with one or more geographic areas; receiving, by a receiving device of the processing server, a data signal superimposed with weather data, wherein the weather data includes weather information for a specific geographic area for a period of time; executing, by a querying module of the processing server, a query on the transaction database to identify a subset of transaction data entries where the geographic location is included in the specific geographic area and where the time and/or date is included in a transaction time period corresponding to the period of time; executing, by the querying module of the processing server, a query on the index database to identify a specific index value associated with the specific geographic area; identifying, by an analytical module of the processing server, one or more purchase behaviors for transaction time period based on at least the transaction content data included in each transaction data entry in the subset of transaction data entries; and estimating, by the analytical module of the processing server, an economic impact for the specific geographic area based on at least the specific index value, the identified one or more purchase behaviors, and the weather information for the specific geographic area and the period of time.

Further, this method may be embodied in a system for indexing economic impact of weather events, comprising: a transaction database of a processing server configured to store a plurality of transaction data entries, wherein each transaction data entry is a structured data set including data related to an electronic payment transaction including at least a geographic location, a time and/or date, and transaction content data; a receiving device of the processing server configured to receive a data signal superimposed with weather data, wherein the weather data includes at least weather information for a geographic area for a plurality of time periods; a querying module of the processing server configured to execute a query on the transaction database to identify a subset of transaction data entries for each of the plurality of time periods where each transaction data entry in the subset includes a time and/or date included one or more transaction time periods respectively corresponding to the respective time period and where the geographic location included in each transaction data entry in the subset is included in the geographic area; an analytical module of the processing server configured to identify one or more purchase behaviors for each of the transaction time periods based on at least the transaction content data included in each transaction data entry in the subset of transaction data entries identified for the transaction time periods; and an indexing module of the processing server configured to identify an index value associated with the geographic area indicative of an economic impact of weather events on the geographic area based on at least changes in the weather information for the geographic area over the plurality of time periods and changes in the corresponding one or more purchase behaviors over the transaction time periods.

As another example, this method may be embodied in a system for indexing economic impact of weather events, comprising: a transaction database of a processing server configured to store a plurality of transaction data entries, wherein each transaction data entry is a structured data set including data related to an electronic payment transaction including at least a geographic location, a time and/or date, and transaction content data; an index database of the processing server configured to store a plurality of index values, wherein each index value is associated with one or more geographic areas; a receiving device of the processing server configured to receive a data signal superimposed with weather data, wherein the weather data includes weather information for a specific geographic area for a period of time; a querying module of the processing server configured to execute a query on the transaction database to identify a subset of transaction data entries where the geographic location is included in the specific geographic area and where the time and/or date is included in a transaction time period corresponding to the period of time, and execute a query on the index database to identify a specific index value associated with the specific geographic area; and an analytical module of the processing server configured to identify one or more purchase behaviors for the transaction time period based on at least the transaction content data included in each transaction data entry in the subset of transaction data entries, and estimate an economic impact for the specific geographic area based on at least the specific index value, the identified one or more purchase behaviors, and the weather information for the specific geographic area and the period of time.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 2A is a diagram illustrating a relationship between different time periods, in which data was collected for indexing economic impact of weather events in accordance with exemplary embodiments.

FIG. 2B is a diagram illustrating a relationship between time periods in which the data was collected and the time period in which the economic impact is estimated.

Figure 1:
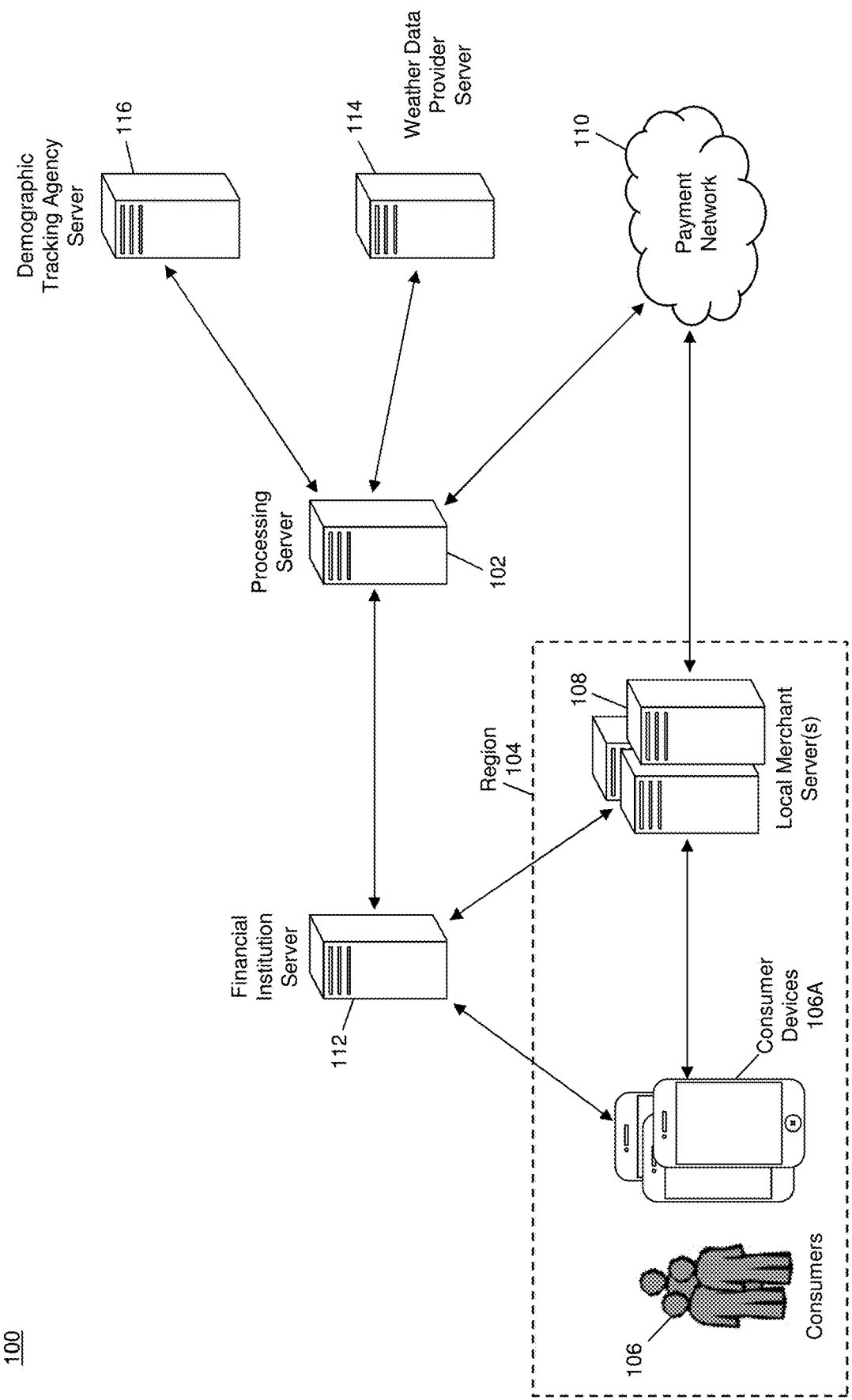
FIG. 1 is a block diagram illustrating a high level system architecture for indexing economic impact of weather events in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Purchase behaviors—may refer to one or more metrics associated with spending of the customers which may include, for example, number of transactions, transaction frequency, average ticket size, aggregate transaction amount, etc., and may be identified for one or more merchants, merchant categories, geographic locations, periods of time, etc., or combinations thereof. For instance, purchase behaviors may include a propensity to visit a specific merchant at a specific time, propensity to visit a type of merchant in a geographic area, likelihood of spending amount, frequency of spending, etc.

Payment Network—may refer to a system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards (e.g., credit cards, pre-paid cards, debit cards, merchant cards, chip and pin cards, payment credentials on mobile devices that may employ near-field communication (NFC), physical and virtual cards, etc.), letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Merchant—may refer to an entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity. For example, when a merchant server may refer to a server on a communication network that is accessible to the merchant and/or controllable by the merchant, the term "merchant server" may be used interchangeably with the term "merchant."

Acquirer—may refer to an entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—may refer to a transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Indexing Economic Impact of Weather Events

FIG. 1A is a block diagram illustrating a high level system architecture of system 100 for indexing economic impact of weather events in accordance with exemplary embodiments.

System 100 may include a processing server 102 configured to calculate an index value for a region 104 based on transaction data regarding past payment transactions conducted by consumers 106, weather data collected by a weather data provider and received from a weather data provider server 114, and, optionally, demographic data received from a demographic tracking agency server 116. The index value for region 104 may indicate an impact on financial status of households within the region caused by one of weather events on consumers, e.g., excessive rainfall causing an increased likelihood of failure to repay a loan by debtors generally, or of a particular debtor, in the region. The calculation of the index value is discussed in more detail below.

Additionally or alternatively, processing server 102 may be configured to identify an index value among multiple index values previously calculated based on a given region and one or more weather events and, further, estimate an economic impact for the region based on the identified index value. The estimation of the economic impact is described in more detail below.

As an exemplary embodiment, the following description relates to the exemplar of a financial institution that has provided or is offering micro-finance loans to its customers (e.g., consumers 106), though the method and system are applicable in many other situations. As depicted in greater detail with respect to FIG. 8, consumers 106 may have conducted one or more payment transactions using his or her payment cards with one or more merchants. In a simplified example for the payment transactions, consumers 106 via consumer devices 106A (e.g., smartphones, laptops, etc.) may initiate a transaction using a payment card as the funding source and identification information of the goods or services, for which consumers 106 intend to pay, to local merchant server(s) 108. The local merchant server(s) 108, upon receiving the transaction request and the identification information, may transmit an authorization request to financial institution servers 112 providing the payment card. If this process, as described in detail with respect to FIG. 8, results in an authorization for the transaction to be charged to the payment card, e.g., local merchant server(s) 108 receives approval signals from payment network 110, the merchant may complete the payment transaction and provide the services or product to the customer 106. Data associated with the payment transactions ("transaction data" hereinafter) may be respectively provided to processing server 102 by local merchant server(s) 108 via payment network 110 or directly from financial institution server 112. For example, with respect to consumers 106, transaction data may include time/date of the transactions, amount of transactions, average ticket amount, payment amount of each transaction, number of transactions, transactions categorized by industry and/or merchant category, location of transaction, etc.

Additionally, consumers 106 via consumer devices 106A may request a loan from the financial institutions. If the request for the loan is approved by the financial institutions, financial institution servers 112 may respectively notify consumers 106 (via consumer devices 106A) and local merchant server(s) 108.

Further, in addition to the transaction data associated with consumers 106, weather data and, optionally, demographic data of consumers 106 may be respectively transmitted from a server 114 of a weather data provider and a server 116 of a demographic tracking agency to processing server 102. Demographic tracking agency may refer to, for example, credit reporting agencies, research firms, demographic data collection agencies or businesses, governmental agencies, census agencies and nearly any other entity that may gather and/or possess demographic data within the relevant geographic area (e.g., zip code, city, state, country). Weather data provider may refer to, for example, weather bureaus, research firms, atmospheric data collection agencies, other private governmental agencies, and nearly any other entity that may gather and/or possess time stamped weather data linked to geographic locations or regions and other information associated with weather events. In a non-limiting example, the weather data may at least include historic weather events (hurricanes (optionally by category), tornadoes (optionally by intensity and damage and/or Fujita scale), blizzards, droughts, fog, high winds and other severe weather), as well as daily, weekly, monthly, and yearly time-based reports of temperature, average temperature, temperature ranges, barometric pressure, cloud conditions, rainfall or snow fall levels, average rainfall or snow fall levels, hail pollen counts, deviations from average and nearly any other measure of weather, historic weather impacts on agriculture of the region (e.g., crop yield change affected by the historic weather events, crop price change affected by the historic weather events, etc.), and/or any other weather forecast information. For purpose of calculating index values as described below, each of the weather events may be represented by or assigned with a value or the raw data values.

Demographic data associated with consumers 106, may include household income, type of household, origin, income equality, region/block level, age, occupation, education, presence of children, etc.

Based on the transaction data, the weather data, and optionally, a portion of the demographic data, processing server 102 may be configured to calculate a correlation value that indicates a correlation relationship between the weather events in a past time period and the financial status of consumers 106 in a corresponding time period. Based on the correlation value, processing server 102 may be further configured to calculate an index value that indicates an impact caused by the weather events on the financial status of consumers 106. Processing server 102 may then transmit the index value to financial institution server 112 for the financial institutions to manage the loan parameters. For example, in anticipation of the customers' decreasing ability to timely repay the loan due to weather events, the financial institutions may adjust the payment cycles such that the customers may have sufficient time to gather funds for the repayments. Alternatively, the financial institutions may stop issuing new loans if the index value indicates that the potential customers' ability to repay the loan will be severely impaired by the weather events. Other responses, of course, are envisioned.

Further, since processing server 102 may be communicatively connected to other financial institutions servers and merchant servers that process payment transactions for customers in other regions, processing server 102 may be configured to gather similar transaction data to those of payment transactions made by consumers 106. Similarly, processing server 102 may receive weather data of other regions and, optionally, demographic data of the consumers in the respective regions. As such, with the implementation of parallel computing technology, processing server 102 may be configured to calculate multiple index values for multiple regions (e.g., more than one hundred counties in the U.S.) simultaneously. The process of calculating the index value(s) is described in more detail below.

FIG. 2A is a diagram illustrating a relationship between different time periods, in which data was collected for indexing economic impact of weather events in accordance with exemplary embodiments. As described above and in more detail below, processing server 102 may receive the transaction data, the weather data, and optionally, the demographic data, and calculate the index value. Depending on the economy of the respective geographical area, transaction data in different time periods may be selected for calculating the index value. In the example depicted in FIG. 2A, regarding an agricultural area, e.g., region 104, since the impacts of weather events on financial status of local consumers may not be instantaneous, transaction period 252 subsequent to time period 250 is selected for the calculation of the index value. Processing server 102 may calculate an index value between the weather data in time period 250 and the transaction data, together with portions of the demographic data, in transaction period 252 for the agricultural area. With respect to another geographical area where outdoor sports, e.g., golf courses, ski resorts, is the most important industry, the impacts of weather events on financial status may be immediate and lasting. As such, transaction period 254, which overlaps with at least a portion of time period 250, may be selected for the calculation of the index value that indicates the weather impact in transaction period 254.

FIG. 2B is a diagram illustrating a relationship between time periods in which the data was collected and the time period in which the economic impact is estimated.

Based on the index value calculated, processing server 102 may be configured to estimate the financial status of consumers 106 in a future time period. As depicted in FIG. 2B, processing server 102 may receive the weather data in time period 256 and calculate the impacts on agriculture area in transaction period 258 or on sport oriented area in transaction period 260.

Processing Server

Figure 3:
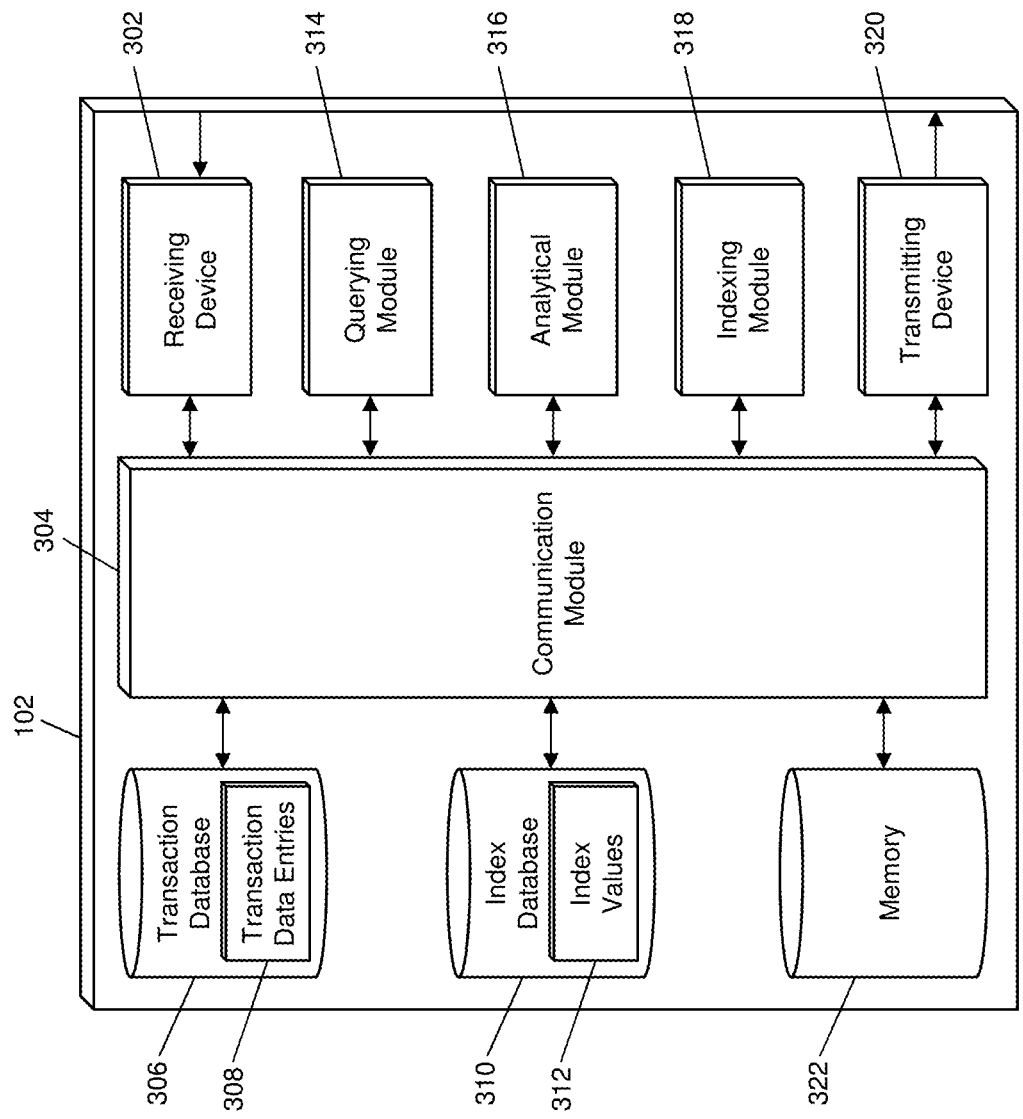
FIG. 3 is a block diagram illustrating the processing server of FIG. 1 for indexing economic impact of weather events in accordance with exemplary embodiments.

FIG. 3 is a block diagram illustrating the processing server of FIG. 1 for indexing economic impact of weather events in accordance with exemplary embodiments.

It will be apparent to persons having skill in the relevant art that the embodiment of the processing server 102 illustrated in FIG. 3 is provided as illustration only and may not be exhaustive to all possible configurations of the processing server 102 suitable for performing the functions as discussed herein. For example, the computer system 900 illustrated in FIG. 9 and discussed in more detail below may be a suitable configuration of the processing server 102.

Processing server 102 may include a processing device. The processing device may be configured to perform the functions of processing server 102 discussed herein as will be apparent to persons having skill in the relevant art. In some embodiments, processing server 102, as shown in FIG. 1, may include a plurality of engines and/or modules specially configured to perform one or more functions of processing server 102, such as a receiving device 302, a querying module 314, an analytical module 316, an indexing module 318, a transmitting device 320, a communication module 304, a transaction database 306 including transaction data entries 308, an index database 310 including index values 312, and a memory 322.

In some implementations, receiving device 302 may be configured to receive data over one or more networks via one or more network protocols. In some embodiments, receiving device 302 may be configured to receive data over the payment rails explained in relation to FIG. 8, such as using specially configured infrastructure associated with payment network 110 for the transmission of transaction data that include sensitive financial data and information. In some instances, receiving device 302 may also be configured to receive data from financial institution server 112, local merchant server(s) 108, demographic tracking agency server 116, weather data provider server 114, and/or other entities via alternative networks, such as the Internet. In some instances, receiving device 302 may include multiple devices, such as different receiving components for receiving data over different networks, such as a first receiving component for receiving data over payment rails and a second receiving component for receiving data over the Internet. Receiving device 302 may be also configured to receive electronically data signals that are transmitted, where data may be superimposed on the data signals and decoded, parsed, read, or otherwise obtained via receipt of the data signals by receiving device 302. In some instances, receiving device 302 may include a parsing module for parsing the received data signals to obtain the data superimposed thereon. For example, receiving device 302 may include a parser program configured to receive and transform the received data signal into usable input for the functions performed by the processing device to carry out the methods and systems described herein.

Receiving device 302 may be configured to receive data signals from payment networks 110, which may be electronically transmitted via the payment rails or other suitable communication network, and may be superimposed with or otherwise comprise transaction data of the payment transactions conducted by customer 106. Receiving device 302 may also receive data signals superimposed with demographical data and weather data respectively from demographic tracking agency server 116 and weather data provider server 114. In some instances, data signals received from data providers 112 may also be superimposed with social activity data associated with geographic areas.

Processing server 102 may also include a communication module 304 configured to transmit data between modules, engines, databases, memories, and other components of the processing server 102 for use in performing the functions discussed herein. Communication module 304 may be comprised of one or more communication types and utilizes various communication methods for communications within a computing device. For example, communication module 304 may include a bus, contact pin connectors, wires, etc. In some embodiments, communication module 304 may also be configured to communicate between internal components of processing server 102 and external components of processing server 102, such as externally connected databases, display devices, input devices, etc.

Processing server 102 may further include transaction database 306, which includes transaction data entries 308. Transaction database 306 may be configured to store transaction data entries 308 for the payment transactions such as data associated with consumers 106 or other authorized users of the related transaction accounts. In some embodiments, each of transaction data entries 308 may be a structured data set (e.g., structured as vectors) including data related an electronic payment transaction conducted by one or more of consumers 106. The data related to the electronic payment transaction may at least include a geographic location of the customer, a time and/or date of the electronic payment transaction, and other transaction content data. The transaction content data may further include the subject of the transaction, e.g., the goods/services, the industry related to the transaction, etc.

As described above, receiving device 302 may be configured to receive data signals superimposed with weather data that includes at least weather information for a geographic area for a plurality of time periods. For example, receiving device 302 may receive data regarding the average rainfall, temperature change, hailstorms, crop yield change affected by the weather, crop price change affected by the weather, in summer time (e.g., from May to September) in Nebraska in 2014. Based on the received weather data, querying module 314 may be configured to execute a query on transaction database 306 to identify a subset of transaction data entries 308 where each transaction data entry in the subset includes a time and/or date included in one or more transaction time periods respectively corresponding to the respective time period and where the geographic location included in each transaction data entry in the subset is included in the geographic area. In other words, querying module 314 may be configured to identify a subset of transaction data in transaction time periods that correspond to the plurality of time periods of the received weather information. The transaction time periods may be subsequent to, prior to, or overlaps with the respective time period. In a non-limiting example, the corresponding transaction time periods may be predetermined based on scientific studies on weather impacts respectively for different area. For example, regarding an agricultural area, the impact of weather events on agriculture may not be instantaneous. Accordingly, querying module 314 may be configured to identify transaction data of consumers 106 in time periods subsequent to the weather events, e.g., three months subsequent to the time period in which the weather data was recorded (from October to December in 2014). In another example, in a sport oriented area, the weather events may have immediate impact on the economy of the sport oriented area. For example, the income of golf courses may decrease during near continuous thunderstorms in summer and thus may affect the golf courses' ability to repay the loans. As such, the transaction time periods may be selected to be one or more time periods that overlaps with the time period in which the weather data was recorded, e.g., transaction period 160.

Based on the identified subset of transaction data, more specifically, the transaction content data included in each transaction data entry in the subset of transaction data, analytical module 316 may be configured to identify one or more purchase behaviors for each of the plurality of time periods. As described in the Glossary section, purchase behaviors may refer to one or more metrics associated with the payment transactions made by consumers 106. Thus, as a non-limiting example, analytical module 316 may identify the monthly average household income, the monthly average spending on foods, fertilizers, and/or home repair materials and tools, etc. of customers in the transaction periods (e.g., from October to December in 2014).

With the received weather data, the identified purchase behaviors, and optionally portions of the demographic data, indexing module 318 may be configured to identify, or calculate, an index value 312 associated with the geographic area indicative of an economic impact of weather events on the geographic area based on at least changes indicated by the received weather data and changes indicated by the corresponding purchase behaviors over the plurality of time periods. A change in the received weather data may refer to a deviation from a calculated weather baseline, e.g., average daily rainfall from May to September in the past five years. Similarly, a change in a corresponding purchase behavior may refer to a deviation from a calculated baseline purchase behavior, e.g., average spending on fertilizers from October to December in the past five years. It is understood that the calculation of the index value 312 indicative of the economic impact weather events may be performed in accordance with multiple algorithms.

In accordance with an exemplary algorithm, by comparing the received weather data with a calculated weather baseline, indexing module 318 may be configured to calculate the changes indicated by the received weather data, e.g., increment in daily rainfall during May to September in 2014. An arbitrary index value, e.g., 10000, may be assigned to the calculated weather baseline. Similarly, by comparing the identified purchase behaviors with the calculated baseline purchase behavior, indexing module 318 may be configured to calculate the changes indicated by the identified purchase behaviors, e.g., increment in spending on fertilizer from October to December 2014, decrement in sale of game consoles from October to December 2014, etc.

Indexing module 318 may be further configured to calculate a correlation value between the changes indicated by the received weather data and each of the changes in purchase behaviors to identify a subset of the purchase behaviors that is mostly impacted by the weather events indicated by the received weather data. In more detail, the changes indicated by the received weather data may be formatted as X and each of the changes in purchase behaviors, which optionally include portions of the demographic data (e.g., monthly income from October to December 2014), may be formatted as Y. The correlation value may be calculates as:

$$\text{corr}(X, Y) = \frac{\text{Cov}(X, Y)}{\sigma_X \sigma_Y} = \frac{E[(X - \mu_X)(Y - \mu_Y)]}{\sigma_X \sigma_Y}$$

in which the Cov(X, Y) represents the covariance of X and Y, $\sigma_x$ and $\sigma_y$ respectively represents the standard deviation of X and Y, $\mu_x$ and $\mu_y$ respectively represents the expected values of X and Y, and E is the expected value operator. One or more purchase behaviors with the highest correlation values (e.g., in transaction period 252) may be identified as the subset of the purchase behaviors. For example, when the received weather data indicates increments in rainfall in summer in region 104, one or more purchase behaviors related to spending on fertilizer, sale of tractors, and price of livestock, may be identified to be closely correlated with the rainfall in summer.

In a non-limiting example, when the received weather data indicates a 20% increment from the calculated weather baseline, the subset of purchase behaviors may show a 27% increment on spending on fertilizers comparing to the spending on fertilizer in the past five years. Indexing module 318 may calculate the index value 312 for the received weather data as follows:

$$I'=I \times C$$

in which I' represents the index value for the received weather data, I represents the index value of the weather baseline, and C represents the change of the identified subset of purchase behaviors, e.g., 127%. Thus, further to the example above, the index value may be calculated as 12700 when the index value assigned to the weather baseline is 10000.

The calculated index value 312 and the corresponding weather data may be stored in index database 310. As mentioned above, processing server 102 with parallel computing capability may be configured to calculate multiple index values 312 for multiple geographic areas simultaneously. The calculated index 312 values for multiple geographic areas and the corresponding weather data may be similarly stored in index database 310 as a basis for estimation of economic impact of weather events on future financial status of consumers 106 in the respective geographic area.

In another exemplary embodiment, receiving device 302 may receive a request for estimation of financial status of consumers 106 in a future time period, which may be affected by past or ongoing weather events. Transmitting device 320 may then transmit a request for the weather data describing the weather events to weather data provider server 114, which may provide the weather data to processing server 102.

Upon receiving the weather data, indexing module 318 may be configured to identify a set of historic weather data (e.g., weather data in time period 250) that is most similar to the received weather data. For example, indexing module 318 may be configured to calculate a similarity value between the received data and each historic weather data set. A historic weather data set with a highest similarity may be identified as the basis for further estimation of the economic impact of the weather events. In some embodiments, the similarity value may be calculated as a Euclidean distance or a Pearson Coefficient between the received data set and each of the stored weather data set. A lowest Euclidean distance or a Pearson Coefficient closest to 1 may indicate a highest similarity.

Further, indexing module 318 may be configured to calculate a change (or a distance) of the received weather data from the most similar historic weather data set. For example, if the received weather data indicates 9 inch rainfall and the most similar historic weather data set indicates 8 inch rainfall, the change between the weather data may be calculated as a 12.5% increase. As such, the index value 312 for the received weather data may be calculated as follows:

$$I''=I' \times C$$

in which I" represents the index value for the received weather data, I' represents the index value of the most similar historic weather data set, and C represents the change between the weather data, e.g., 112.5%. Thus, if the index value for the most similar historic weather data set is 12700, the index value of the received weather data is calculated to be 14287.5.

With respect to the historic weather data set, analytical module 316 may be configured to identify the subset of the purchase behaviors that was used for calculating the index value 312 associated with the historic weather data set. For example, spending on fertilizer may be previously used for calculating the index value 312 for the historic weather data set. Based on the calculated index value 312 and the identified subset of the purchase behaviors, analytical module 316 may calculate the economic impact on spending on fertilizer as follows:

$$Impact = I''/I$$

in which I represents the index value of the weather baseline and I'' represents the index value calculated for the received weather data. For example, when the index value of the weather baseline was previously assigned as 10000 and the index value of the received weather data is calculated to be 14287.5, the impact on future spending on fertilizer may be calculated to be 42.875% increase from the spending on fertilizer in the past five years. The estimation process is described in more detail in accordance with FIGS. 4-7.

Regarding other components of processing server 102, transmitting device 320 may be configured to electronically transmit data signals to financial institution server 112, local merchant server(s) 108, weather data provider server 114, demographic tracking agency server 116, and/or other entities communicatively connected thereto. In some implementations, the data signals may be superimposed with requests for weather data from weather data provider server 114, requests for demographic data from demographic tracking agency server 116, and/or transaction data from financial institution server 112 and local merchant server(s) 108.

Memory 322 of processing server 102 may be configured to store data for use by processing server 102 in performing the functions discussed herein. Memory 322 may be configured to store data using suitable data formatting methods and schema and may be any suitable type of memory, such as read-only memory, random access memory, etc. Memory 322 may include, for example, encryption keys and algorithms, communication protocols and standards, data formatting standards and protocols, program code for modules and application programs of the processing device, and other data that may be suitable for use by processing server 102 in the performance of the functions disclosed herein as will be apparent to persons having skill in the relevant art.

Figure 4:
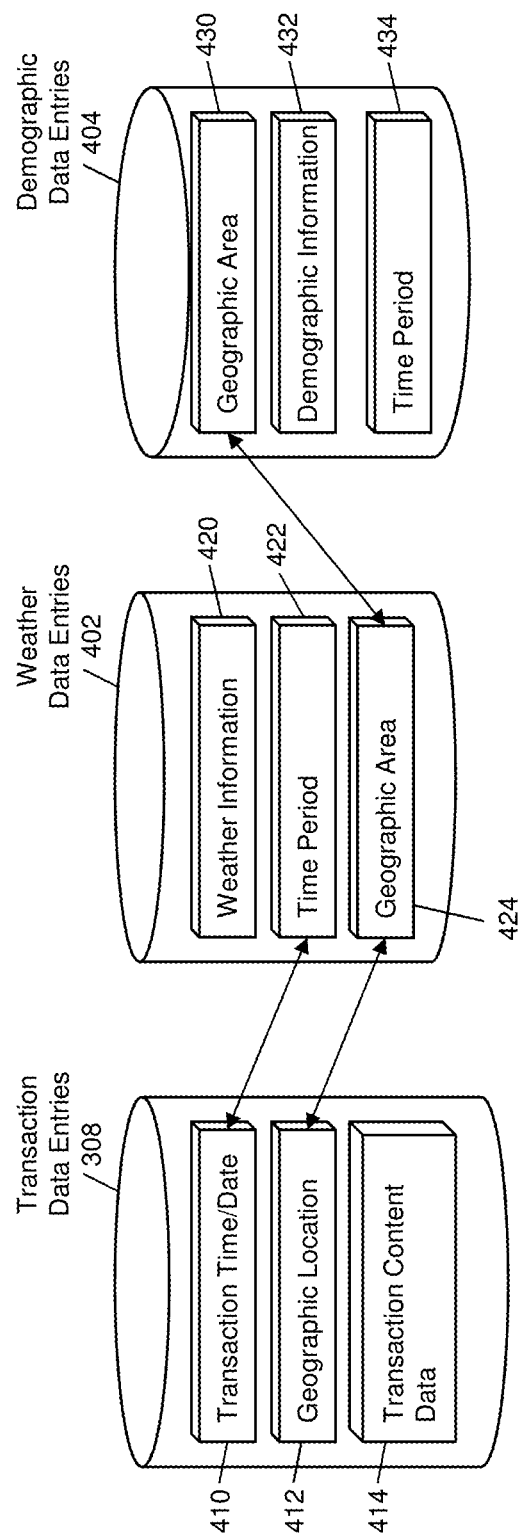
FIG. 4 is a diagram illustrating the data correlation among multiple databases for indexing economic impact of weather events in accordance with exemplary embodiments.

FIG. 4 is a diagram illustrating the data correlation among multiple databases for indexing economic impact of weather events in accordance with exemplary embodiments.

As described above, receiving device 302 may be configured to receive different data respectively from weather data provider server 114, requests for demographic data from demographic tracking agency server 116, and/or transaction data from financial institution server 112 and local merchant server(s) 108. The different data may be stored in memory 322 respectively as data entries, such as transaction data entries 308, weather data entries 402, and demographic data entries 404.

As depicted in FIG. 4, transaction data entries 308 may include transaction time/date 410, geographic location 412, and transaction content 414. In more detail, transaction time/date 410 may refer to one or more fields of transaction data entries 308 indicative of the time/date when the payment transactions occurred. Geographic location 412 may refer to one or more fields of transaction data entries 308 indicative of the location of the customers at the time of the payment transaction. Transaction content 414 may refer to one or more fields of transaction data entries 308 indicative of the subject the corresponding payment transactions, e.g., goods, services, categories, industries, primary account number, consumer data, merchant data, issuer data, acquirer data, point of sale data, loyalty data, reward data, offer data, and/or product data, etc.

Weather data entries 402 may include weather information 420, time period 422, and geographic area 424. Weather information 420 may refer to one or more fields of weather data entries 420 indicative of historic weather events, impacts on agriculture, and/or forecast of upcoming weather events. Time period 422 may refer to one or more fields of weather data entries 420 indicative of the time period in which the historic weather events lasted or the upcoming weather events are predicted to last. Geographic area 424 may refer to one or more fields of weather data entries 420 indicative of the geographic area that was affected by the historic weather events or will be affected by the upcoming weather events.

Demographic data entries 404 may include geographic area 430, demographic information 432, and time period 434. Geographic area 430 may refer to one or more fields of demographic data entries 404 indicative of home address and/or work address of consumers 106. Demographic information 432 may refer to one or more fields of demographic data entries 404 indicative of other demographic information including household income, type of household, origin, income equality, region/block level, age, occupation, education, presence of children, etc. Time period 434 may refer to the time/date of the respective demographic information.

Further to the example given in accordance with FIG. 3, when receiving device 302 of processing server 102 receives the weather data including time period 422 and geographic area 424, querying module 314 may be configured to execute a query on transaction database 306 to identify a subset of transaction data entries 308 that includes geographic location 412 within geographic area 424 and includes transaction time/date 410 within or corresponding to time period 422. Further, querying module 314 may similarly be configured to execute a query on demographic data entries 404 to identify a subset of demographic data that includes geographic area 430 that matches geographic area 424. As such, indexing module 318 may be configured to calculate the index value 312 based on the identified subset of transaction data and the identified subset of demographic data as described above.

Figure 5:
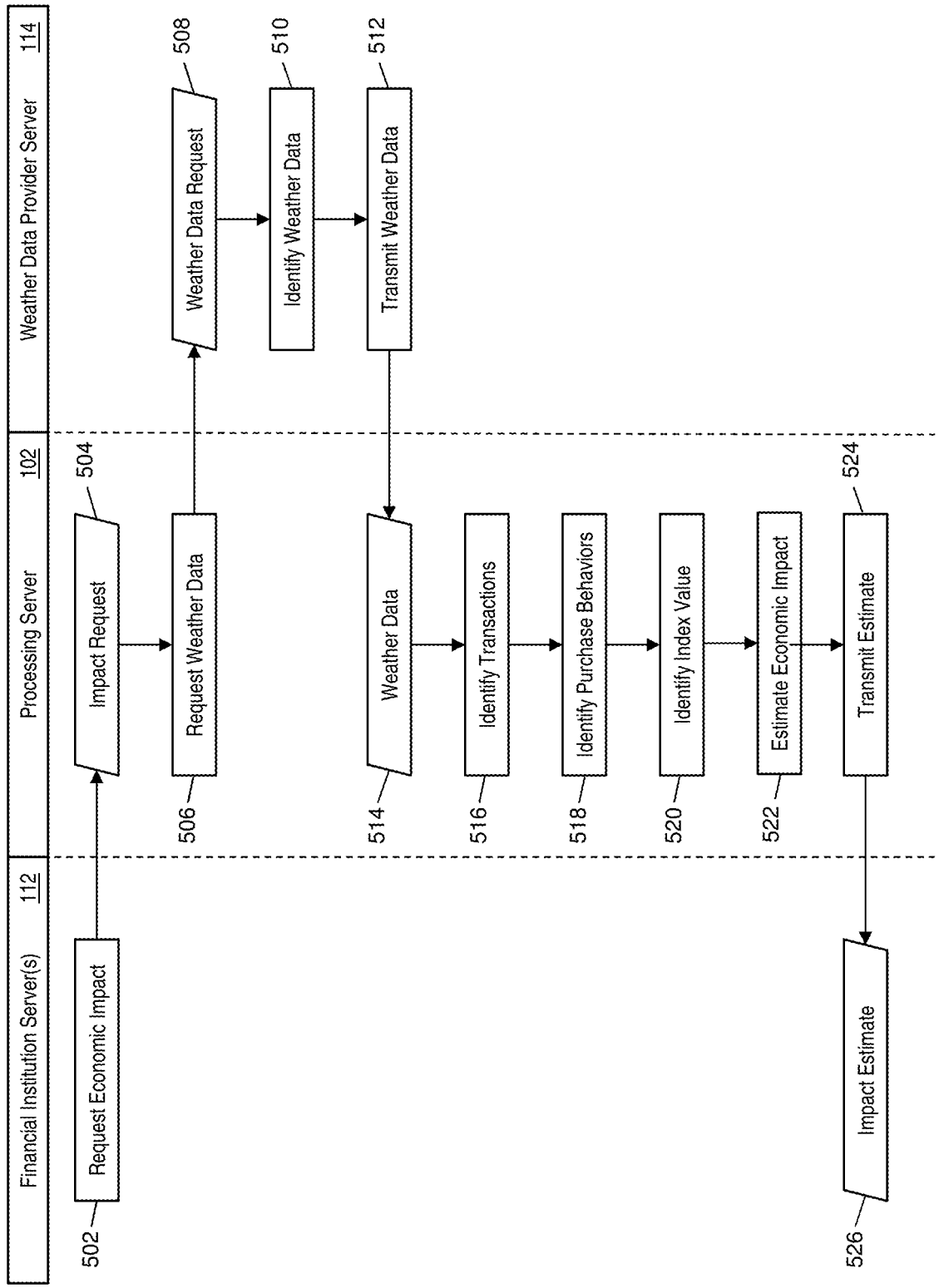
FIG. 5 is a flow diagram illustrating the interaction among the financial institution server, the processing server, and the weather data provider server for indexing economic impact of weather events in accordance with exemplary embodiments.

Exemplary Interactions Between Servers for Estimating Economic Impact of Weather Events FIG. 5 is a flow diagram illustrating the interaction among the financial institution server, the processing server, and the weather data provider server for indexing economic impact of weather events in accordance with exemplary embodiments.

At 502, financial institution server 112 may be configured to transmit impact request 504 to processing server 102 for an estimate economic impact of weather events in a future time period. Impact request 504 may at least include the future time period and a geographic area. At 506, upon receiving impact request 504, processing server 102 may be configured to transmit a weather data request 508 to request weather data in a time period corresponding to the future time period (e.g., weather data recorded within a three-month period prior to the future time period or weather forecast data in the future time period) and the geographic area from weather data provider server 114. At 510, weather data provider server 114 may be configured to identify relevant weather data regarding the geographic area included in weather data request 508. At 512, weather data provider server 114 may be configured to transmit the identified weather data, e.g., weather data 514, to processing server 102. Additionally, processing server 102 may also identify a set of historic weather data that is most similar to the requested weather data. For example, a set of the historic weather data, which indicates rainfall in summer 2014, may be identified to be most similar to the requested weather data. At 516, processing server 102 may be configured to identify transaction data of consumers 106 corresponding to the set of historic weather data. For example, transaction data in fall 2014 may be identified. The transaction data may serve as a basis for the estimation of the economic impact in the future time period. At 518, processing server 102 may be configured to identify one or more purchase behaviors which were used for calculating the index value of the historic weather data. At 520, processing server 102 may be configured to identify an index value 312 corresponding to the received weather data and the geographic area. In more detail, since the index values 312 and the corresponding weather data are stored in index database 310, processing server 102 may identify the index value associated with the identified set of historic weather data. Based on the difference between the received weather data and the historic weather data, processing server 102 may calculate an index value 312 for the received weather data. At 522, processing server 102 may be configured to estimate the economic impact of the weather events on the transaction data of consumers 106 in the future time period based on the calculated index value for the received weather data, an index value previously assigned as a baseline, and the purchase behavior in the past as the baseline. At 524, processing server 102 may transmit the economic impact estimate 526 to financial institution server 112.

Exemplary Method for Indexing Economic Impact of Weather Events

Figure 6:
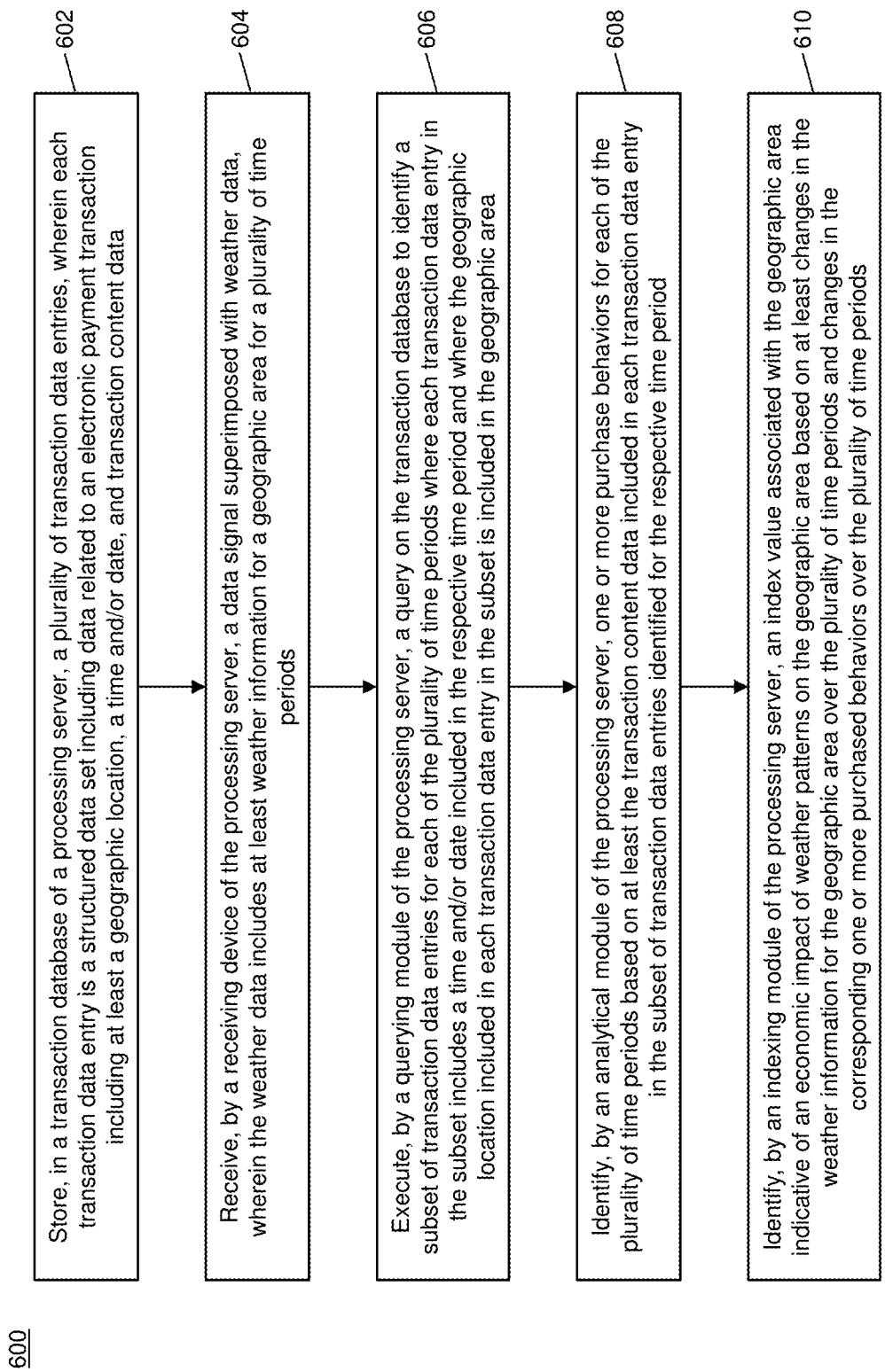
FIG. 6 is a flow chart illustrating a process for indexing economic impact of weather events in accordance with exemplary embodiments.

FIG. 6 is a flow chart illustrating a process 600 for indexing economic impact of weather events in accordance with exemplary embodiment.

At 602, transaction database 306 of processing server 102 may be configured to store transaction data entries 308. Each of transaction data entries 308 may be a structured data set (e.g., formatted as vectors) including data related to one or more electronic payment transactions made by consumers 106. Data related to each of the electronic payment transactions may at least include a geographic location of consumers 106, a time and/or date when the payment transaction occurred, and transaction content data that includes the subject of the transaction, e.g., the goods/services, the industry related to the transaction, etc.

At 604, receiving device 302 of processing server 102 may be configured to receive data signals superimposed with weather data that includes weather information (e.g., historic weather events) for a geographic area for a plurality of times periods. For example, receiving device 302 may receive the weather data including average rainfall, temperature change, hailstorms, crop yield change affected by the weather, crop price change affected by the weather, in summer time (e.g., from May to September) in Nebraska in 2014.

At 606, querying module 314 of processing server 102 may be configured to execute a query on transaction database 306 to identify a subset of transaction data entries for each of the plurality of time periods where each transaction data entry in the subset includes a time and/or date included in one or more transaction time periods respectively corresponding to the respective time period and where the geographic location included in each transaction data entry in the subset is included in the geographic area. In other words, querying module 314 may be configured to identify a subset of transaction data in transaction time periods that correspond to the plurality of time periods of the received weather information. The transaction time period may be subsequent to, prior to, or overlaps with the respective time period. For example, querying module 314 may be configured to identify transaction data of customers in Nebraska in winter time (e.g., from October to December) in 2014. Alternatively or additionally, querying module 314 may be configured to identify transaction data of customers in Nebraska in summer time, which overlaps with the respective time period in which the weather information was recorded.

At 608, analytical module 316 of processing server 102 may be configured to identify one or more purchase behaviors for each of the transaction time periods based on at least the transaction content data included in each transaction data entry in the subset of transaction data entries identified for the transaction time periods. For example, analytical module 316 may identify one or more purchase behaviors that are mostly impacted by the weather events indicated by the received weather data. The one or more identified behaviors may include the monthly average spending on foods, fertilizers, and/or home repair materials and tools, etc. of customers in Nebraska from October to December in 2014.

At 610, indexing module 318 of processing server 102 may be configured to identify, or calculate, an index value associated with the geographic area indicative of an economic impact of weather events on the geographic area based on at least changes in the received weather data and changes in the corresponding purchase behaviors over the plurality of time periods. In a non-limiting example, indexing module 318 may be configured to calculate an index value 312 to indicate the economic impact of weather events on the financial status of consumers 106 in the geographic area. The calculated index value 312 and the corresponding weather data may be stored in index database 310. In some other examples, indexing module 318 may be configured to calculate the index value 312 in consideration of data sets that include both the transaction data and, at least, a portion of demographic data of consumers 106.

Additionally, processing server 102 with parallel computing capability may be configured to calculate multiple index values for multiple geographic areas simultaneously. The calculated index values and the corresponding weather data may be similarly stored in index database 310 as a basis for estimation of economic impact of future weather events on the financial status of consumers 106 in the respective geographic area.

Figure 7:
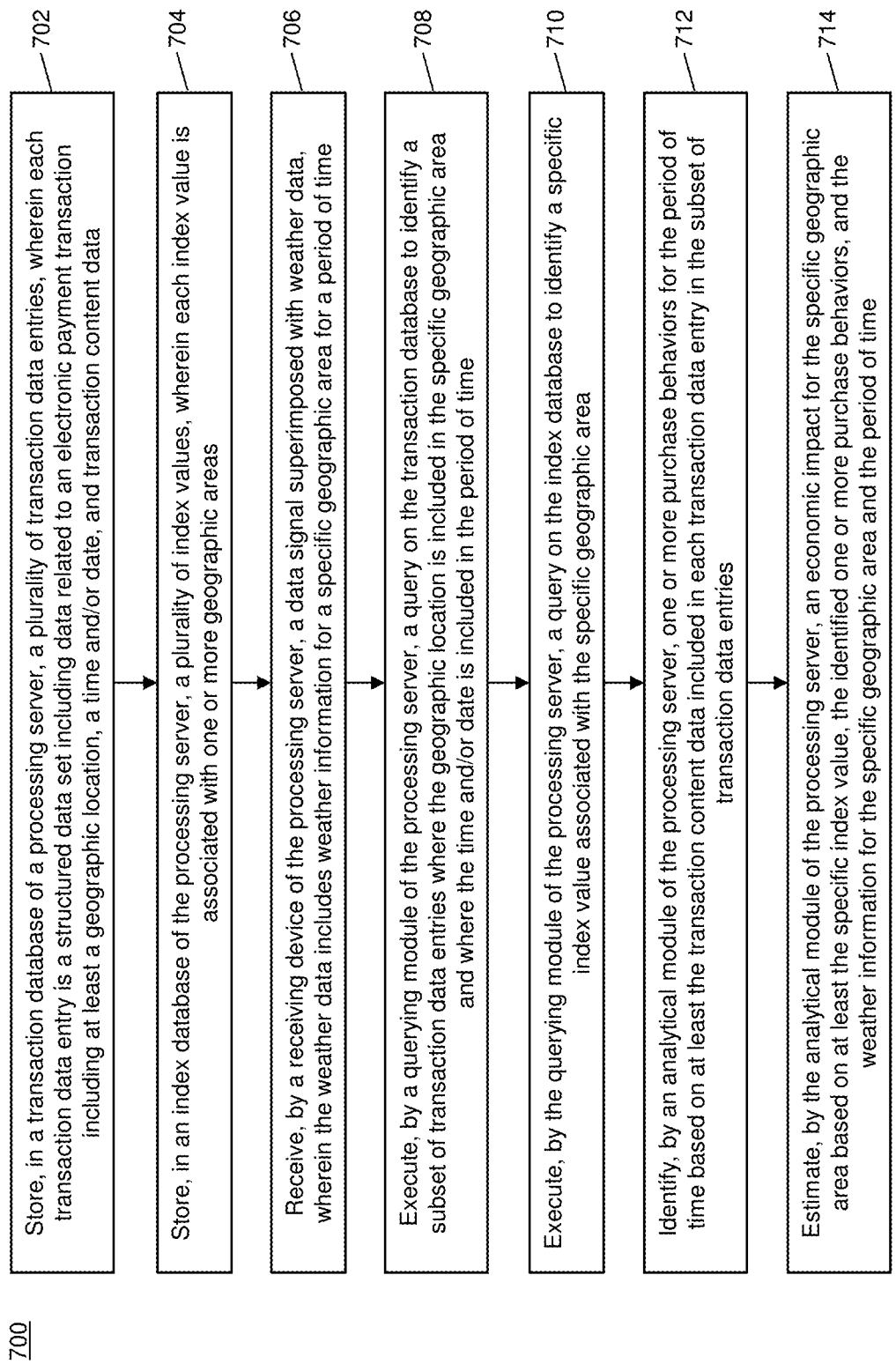
FIG. 7 is another flow chart illustrating a process for indexing economic impact of weather events in accordance with exemplary embodiments.

Exemplary Method for Estimating Economic Impact of Weather Events Based on Calculated Index Values FIG. 7 is another flow chart illustrating a process for indexing economic impact of weather events in accordance with exemplary embodiments.

At 702, transaction database 306 may be configured to store a plurality of transaction data entries, e.g., transaction data entries 308. Each of transaction data entries 308 may be a structured data set (e.g., formatted as vectors) including data related to one or more electronic payment transactions made by consumers 106. As described above, data related to each of the electronic payment transactions may at least include a geographic location of consumers 106, a time and/or date when the payment transaction occurred, and transaction content data that includes the subject of the transaction, e.g., the goods/services, the industry related to the transaction, etc.

At 704, index database 310 may be configured to store index values 312 that were previously calculated by indexing module 318. Each of index values 312 is associated with a geographic area and corresponding weather data. For example, one of index values 312 may be associated with a county in Nebraska and rainfall in summer time. This particular index value, as in the example, may indicate the impact of the rainfall in summer on the financial status of customers in Nebraska.

At 706, receiving device 302 of processing server 102 may be configured to receive a data signal superimposed with weather data, wherein the weather data includes weather information for a specific geographic area for a period of time. For example, when processing server 102 receives a request to estimate the economic impact on transaction data of consumers 106 in Nebraska in the next three months due to the excessive rainfall occurred in the past three months, processing server 102 may request the weather data in the past three months in Nebraska and receive the weather data from weather data provider server 114. Additionally, upon receiving the weather data, indexing module 318 may be configured to identify a set of historic weather data (e.g., weather data in time period 250) that is most similar to the received weather data. For example, indexing module 318 may identify a set of historic weather data describing excessive rainfall two years ago as the most similar historic weather data.

At 708, querying module 314 of processing server 102 may be configured to execute a query on transaction database 306 to identify a subset of transaction data entries 308 where the geographic location is included in the specific geographic area and where the time and/or date is included in the period of time. These transaction data entries 308 are the ones used for calculating the index value for the set of historic weather data. Further to the example above, when processing server 102 identifies the set of historic weather data describing excessive rainfall two years ago, querying module 314 may be configured to identify a subset of transaction data that describes the payment transactions occurred during three months after the excessive rainfall in Nebraska.

At 710, querying module 314 may be further configured to execute another query on index database 310 to identify an index value 312 associated with the specific geographic area and the received weather data. In a more detailed example, if the received weather data indicates 9 inch rainfall and the most similar historic weather data set indicates 8 inch rainfall, the change between the weather data may be calculated as a 12.5% increase. Thus, if the index value for the most similar historic weather data set is 12700, the index value of the received weather data is calculated to be 14287.5.

At 712, analytical module 316 of processing server 102 may be configured to identify one or more purchase behaviors for the transaction time period based on the transaction content data included in each transaction data entry in the subset of transaction data entries. Further to the example described at 708, when querying module 314 identifies a subset of transaction data that describes the payment transactions occurred in three months after the excessive rainfall two years ago, analytical module 316 may be configured to identify one or more purchase behaviors in the three months, e.g., average monthly spending on foods, which were used for calculating the index value associated with the historic weather data set.

At 714, analytical module 316 may be further configured to estimate an economic impact for the specific geographic area based on at least the specific index value, the identified one or more purchase behaviors, and the weather information for the specific geographic area and the period of time. Based on the calculated index value and the identified subset of the purchase behaviors, analytical module 316 may calculate the economic impact on spending on fertilizer as follows:

$$\text{Impact} = I''/I$$

in which I represents the index value of the weather baseline and I'' represents the index value calculated for the received weather data.

Payment Transaction Processing System and Process

Figure 8:
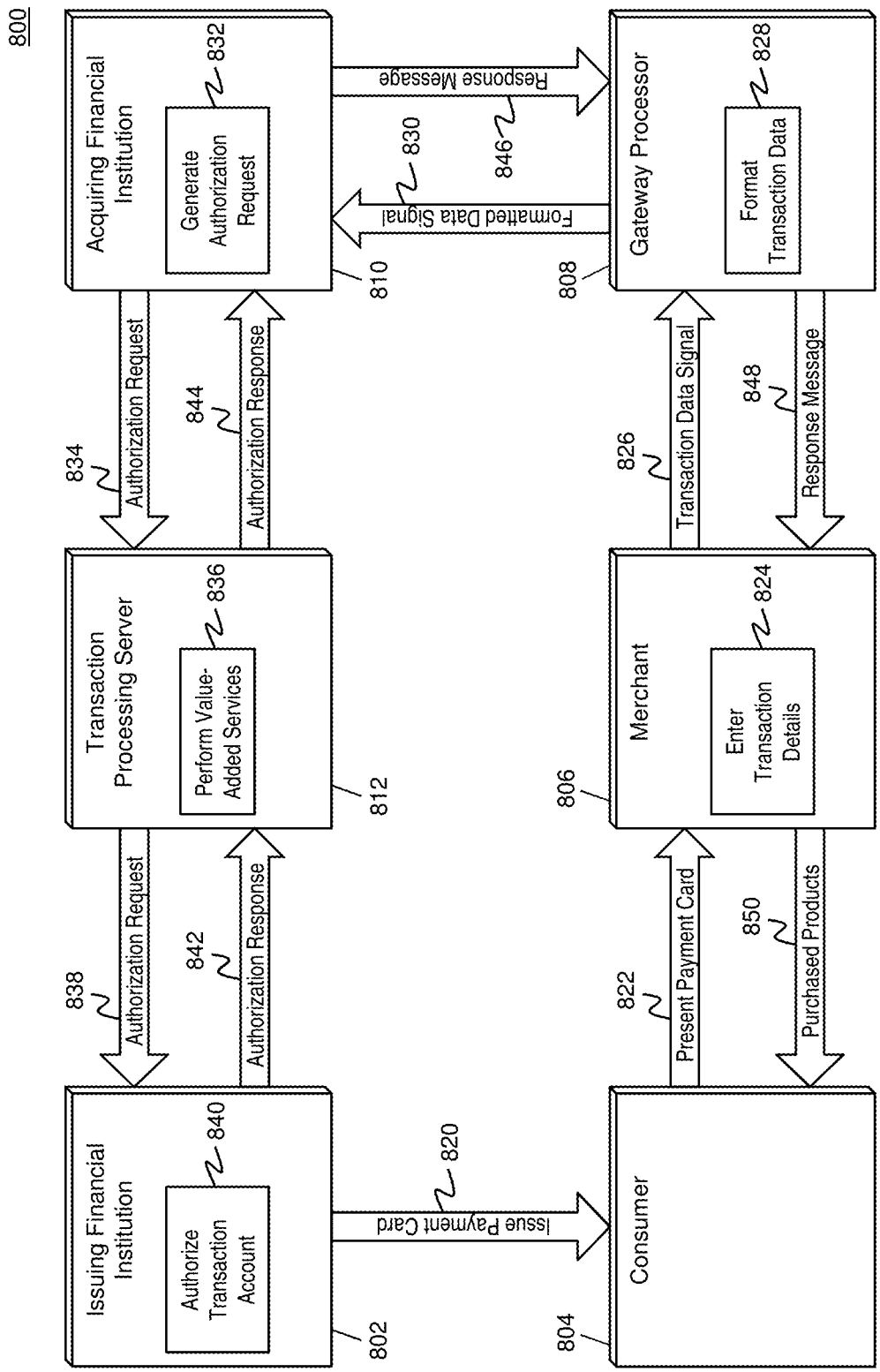
FIG. 8 is a flow diagram illustrating the processing of a payment transaction in accordance with exemplary embodiments.

FIG. 8 is a flow diagram illustrating the processing of a payment transaction in accordance with exemplary embodiments.

The process 800 and steps included therein may be performed by one or more components of the system 100 discussed above, such as the processing server 102, financial institution server 112, local merchant server(s) 108, payment network 110, etc. The processing of payment transactions using the system and process 800 illustrated in FIG. 8 and discussed below may utilize the payment rails, which may be comprised of the computing devices and infrastructure utilized to perform the steps of the process 800 as specially configured and programmed by the entities discussed below, including the transaction processing server 812, which may be associated with one or more payment networks configured to processing payment transactions. It will be apparent to persons having skill in the relevant art that the process 800 may be incorporated into the processes illustrated in FIGS. 5-7 discussed above, with respect to the step or steps involved in the processing of a payment transaction. In addition, the entities discussed herein for performing the process 800 may include one or more computing devices or systems configured to perform the functions discussed below. For instance, the merchant 806 may be comprised of one or more point of sale devices, a local communication network, a computing server, and other devices configured to perform the functions discussed below.

In step 820, an issuing financial institution 802 may issue a payment card or other suitable payment instrument to a consumer 804. The issuing financial institution may be a financial institution, such as a bank, or other suitable type of entity that administers and manages payment accounts and/or payment instruments for use with payment accounts that can be used to fund payment transactions. The consumer 804 may have a transaction account with the issuing financial institution 802 for which the issued payment card is associated, such that, when used in a payment transaction, the payment transaction is funded by the associated transaction account. In some embodiments, the payment card may be issued to the consumer 804 physically. In other embodiments, the payment card may be a virtual payment card or otherwise provisioned to the consumer 804 in an electronic format.

In step 822, the consumer 804 may present the issued payment card to a merchant 806 for use in funding a payment transaction. The merchant 806 may be a business, another consumer, or any entity that may engage in a payment transaction with the consumer 804. The payment card may be presented by the consumer 804 via providing the physical card to the merchant 806, electronically transmitting (e.g., via near field communication, wireless transmission, or other suitable electronic transmission type and protocol) payment details for the payment card, or initiating transmission of payment details to the merchant 806 via a third party. The merchant 806 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 824, the merchant 806 may enter transaction details into a point of sale computing system. The transaction details may include the payment details provided by the consumer 804 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 806 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 806 may be an online retailer in an e-commerce transaction. In such embodiments, the transaction details may be entered in a shopping cart or other repository for storing transaction data in an electronic transaction as will be apparent to persons having skill in the relevant art.

In step 826, the merchant 806 may electronically transmit a data signal superimposed with transaction data to a gateway processor 808. The gateway processor 808 may be an entity configured to receive transaction details from a merchant 806 for formatting and transmission to an acquiring financial institution 810. In some instances, a gateway processor 808 may be associated with a plurality of merchants 806 and a plurality of acquiring financial institutions 810. In such instances, the gateway processor 808 may receive transaction details for a plurality of different transactions involving various merchants, which may be forwarded on to appropriate acquiring financial institutions 810. By having relationships with multiple acquiring financial institutions 810 and having the requisite infrastructure to communicate with financial institutions using the payment rails, such as using application programming interfaces associated with the gateway processor 808 or financial institutions used for the submission, receipt, and retrieval of data, a gateway processor 808 may act as an intermediary for a merchant 806 to be able to conduct payment transactions via a single communication channel and format with the gateway processor 808, without having to maintain relationships with multiple acquiring financial institutions 810 and payment processors and the hardware associated thereto. Acquiring financial institutions 810 may be financial institutions, such as banks, or other entities that administers and manages payment accounts and/or payment instruments for use with payment accounts. In some instances, acquiring financial institutions 810 may manage transaction accounts for merchants 806. In some cases, a single financial institution may operate as both an issuing financial institution 802 and an acquiring financial institution 810.

The data signal transmitted from the merchant 806 to the gateway processor 808 may be superimposed with the transaction details for the payment transaction, which may be formatted based on one or more standards. In some embodiments, the standards may be set forth by the gateway processor 808, which may use a unique, proprietary format for the transmission of transaction data to/from the gateway processor 808. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 808.

In step 828, the gateway processor 808 may parse the transaction data signal to obtain the transaction data superimposed thereon and may format the transaction data as necessary. The formatting of the transaction data may be performed by the gateway processor 808 based on the proprietary standards of the gateway processor 808 or an acquiring financial institution 810 associated with the payment transaction. The proprietary standards may specify the type of data included in the transaction data and the format for storage and transmission of the data. The acquiring financial institution 810 may be identified by the gateway processor 808 using the transaction data, such as by parsing the transaction data (e.g., deconstructing into data elements) to obtain an account identifier included therein associated with the acquiring financial institution 810. In some instances, the gateway processor 808 may then format the transaction data based on the identified acquiring financial institution 810, such as to comply with standards of formatting specified by the acquiring financial institution 810. In some embodiments, the identified acquiring financial institution 810 may be associated with the merchant 806 involved in the payment transaction, and, in some cases, may manage a transaction account associated with the merchant 806.

In step 830, the gateway processor 808 may electronically transmit a data signal superimposed with the formatted transaction data to the identified acquiring financial institution 810. The acquiring financial institution 810 may receive the data signal and parse the signal to obtain the formatted transaction data superimposed thereon. In step 832, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 806 involved in the payment transaction is requesting payment or a promise of payment from the issuing financial institution 802 for the transaction. The authorization request may include a plurality of data elements, each data element being configured to store data as set forth in the associated standards, such as for storing an account number, application cryptogram, transaction amount, issuing financial institution 802 information, etc.

In step 834, the acquiring financial institution 810 may electronically transmit the authorization request to a transaction processing server 812 for processing. The transaction processing server 812 may be comprised of one or more computing devices as part of a payment network configured to process payment transactions. In some embodiments, the authorization request may be transmitted by a transaction processor at the acquiring financial institution 810 or other entity associated with the acquiring financial institution. The transaction processor may be one or more computing devices that include a plurality of communication channels for communication with the transaction processing server 812 for the transmission of transaction messages and other data to and from the transaction processing server 812. In some embodiments, the payment network associated with the transaction processing server 812 may own or operate each transaction processor such that the payment network may maintain control over the communication of transaction messages to and from the transaction processing server 812 for network and informational security.

In step 836, the transaction processing server 812 may perform value-added services for the payment transaction. Value-added services may be services specified by the issuing financial institution 802 that may provide additional value to the issuing financial institution 802 or the consumer 804 in the processing of payment transactions. Value-added services may include, for example, fraud scoring, transaction or account controls, account number mapping, offer redemption, loyalty processing, etc. For instance, when the transaction processing server 812 receives the transaction, a fraud score for the transaction may be calculated based on the data included therein and one or more fraud scoring algorithms and/or engines. In some instances, the transaction processing server 812 may first identify the issuing financial institution 802 associated with the transaction, and then identify any services indicated by the issuing financial institution 802 to be performed. The issuing financial institution 802 may be identified, for example, by data included in a specific data element included in the authorization request, such as an issuer identification number. In another example, the issuing financial institution 802 may be identified by the primary account number stored in the authorization request, such as by using a portion of the primary account number (e.g., a bank identification number) for identification.

In step 838, the transaction processing server 812 may electronically transmit the authorization request to the issuing financial institution 802. In some instances, the authorization request may be modified, or additional data included in or transmitted accompanying the authorization request as a result of the performance of value-added services by the transaction processing server 812. In some embodiments, the authorization request may be transmitted to a transaction processor (e.g., owned or operated by the transaction processing server 812) situated at the issuing financial institution 802 or an entity associated thereof, which may forward the authorization request to the issuing financial institution 802.

In step 840, the issuing financial institution 802 may authorize the transaction account for payment of the payment transaction. The authorization may be based on an available credit amount for the transaction account and the transaction amount for the payment transaction, fraud scores provided by the transaction processing server 812, and other considerations that will be apparent to persons having skill in the relevant art. The issuing financial institution 802 may modify the authorization request to include a response code indicating approval (e.g., or denial if the transaction is to be denied) of the payment transaction. The issuing financial institution 802 may also modify a message type indicator for the transaction message to indicate that the transaction message is changed to be an authorization response. In step 842, the issuing financial institution 802 may transmit (e.g., via a transaction processor) the authorization response to the transaction processing server 812.

In step 844, the transaction processing server 812 may forward the authorization response to the acquiring financial institution 810 (e.g., via a transaction processor). In step 846, the acquiring financial institution may generate a response message indicating approval or denial of the payment transaction as indicated in the response code of the authorization response, and may transmit the response message to the gateway processor 808 using the standards and protocols set forth by the gateway processor 808. In step 848, the gateway processor 808 may forward the response message to the merchant 806 using the appropriate standards and protocols. In step 850, assuming the transaction was approved, the merchant 806 may then provide the products purchased by the consumer 804 as part of the payment transaction to the consumer 804.

In some embodiments, once the process 800 has completed, payment from the issuing financial institution 802 to the acquiring financial institution 810 may be performed. In some instances, the payment may be made immediately or within one business day. In other instances, the payment may be made after a period of time, and in response to the submission of a clearing request from the acquiring financial institution 810 to the issuing financial institution 802 via the transaction processing server 802. In such instances, clearing requests for multiple payment transactions may be aggregated into a single clearing request, which may be used by the transaction processing server 812 to identify overall payments to be made by whom and to whom for settlement of payment transactions.

In some instances, the system may also be configured to perform the processing of payment transactions in instances where communication paths may be unavailable. For example, if the issuing financial institution 802 is unavailable to perform authorization of the transaction account (e.g., in step 840), the transaction processing server 812 may be configured to perform authorization of transactions on behalf of the issuing financial institution 802. Such actions may be referred to as "stand-in processing," where the transaction processing server "stands in" as the issuing financial institution 802. In such instances, the transaction processing server 812 may utilize rules set forth by the issuing financial institution 802 to determine approval or denial of the payment transaction, and may modify the transaction message accordingly prior to forwarding to the acquiring financial institution 810 in step 844. The transaction processing server 812 may retain data associated with transactions for which the transaction processing server 812 stands in, and may transmit the retained data to the issuing financial institution 802 once communication is reestablished. The issuing financial institution 802 may then process transaction accounts accordingly to accommodate for the time of lost communication.

In another example, if the transaction processing server 812 is unavailable for submission of the authorization request by the acquiring financial institution 810, then the transaction processor at the acquiring financial institution 810 may be configured to perform the processing of the transaction processing server 812 and the issuing financial institution 802. The transaction processor may include rules and data suitable for use in making a determination of approval or denial of the payment transaction based on the data included therein. For instance, the issuing financial institution 802 and/or transaction processing server 812 may set limits on transaction type, transaction amount, etc. that may be stored in the transaction processor and used to determine approval or denial of a payment transaction based thereon. In such instances, the acquiring financial institution 810 may receive an authorization response for the payment transaction even if the transaction processing server 812 is unavailable, ensuring that transactions are processed and no downtime is experienced even in instances where communication is unavailable. In such cases, the transaction processor may store transaction details for the payment transactions, which may be transmitted to the transaction processing server 812 (e.g., and from there to the associated issuing financial institutions 802) once communication is reestablished.

In some embodiments, transaction processors may be configured to include a plurality of different communication channels, which may utilize multiple communication cards and/or devices, to communicate with the transaction processing server 812 for the sending and receiving of transaction messages. For example, a transaction processor may be comprised of multiple computing devices, each having multiple communication ports that are connected to the transaction processing server 812. In such embodiments, the transaction processor may cycle through the communication channels when transmitting transaction messages to the transaction processing server 812, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 810 may identify that an authorization request involves an issuing financial institution 802 (e.g., via the bank identification number included in the transaction message) for which no value-added services are required. The transaction processor at the acquiring financial institution 810 may then transmit the authorization request directly to the transaction processor at the issuing financial institution 802 (e.g., without the authorization request passing through the transaction processing server 812), where the issuing financial institution 802 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 812 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 808, acquiring financial institution 810, etc.) for processing using this advanced network, and to quickly and efficiently receive a response regarding the ability for a consumer 804 to fund the payment transaction.

Computer System Architecture

Figure 9:
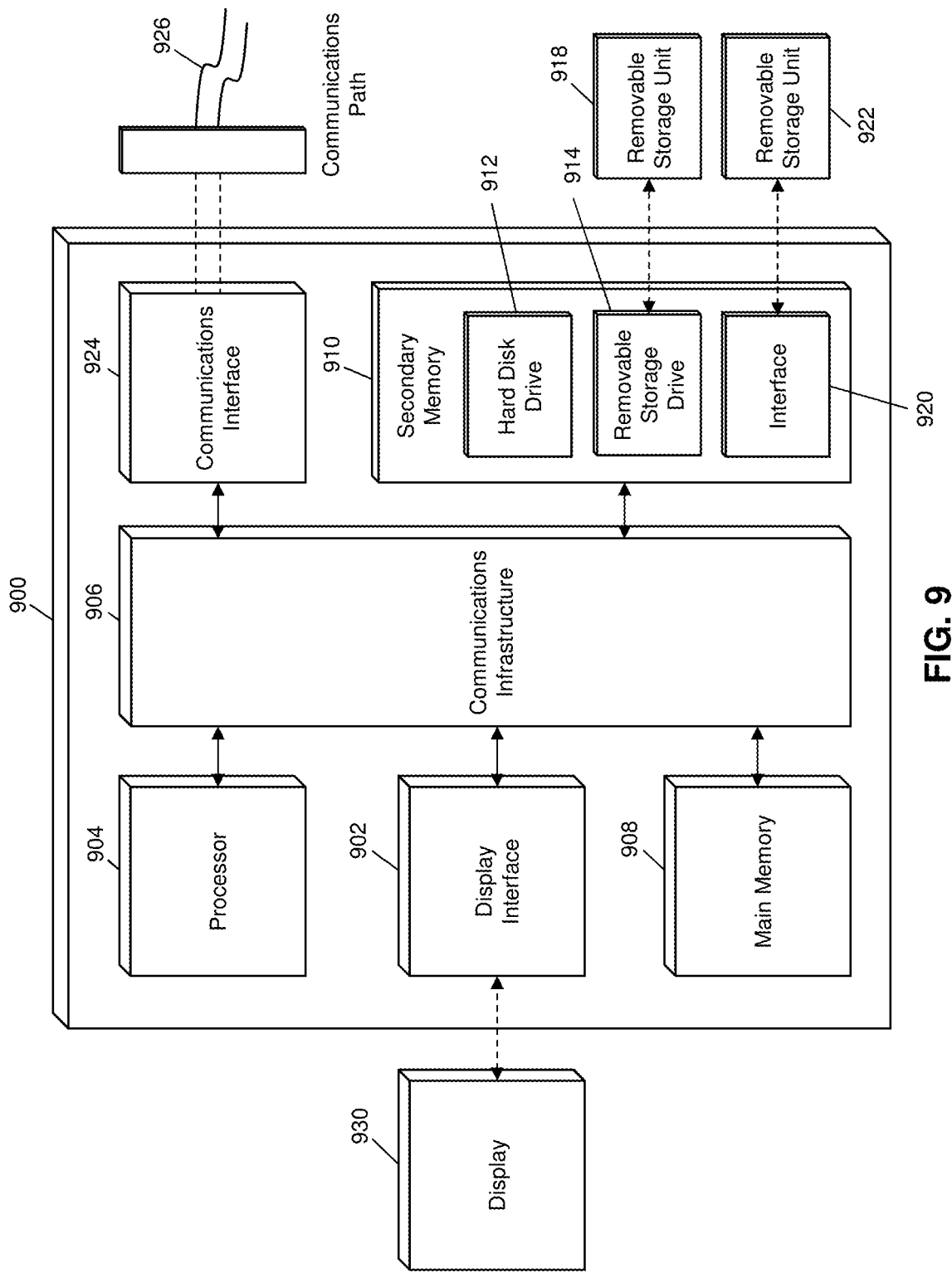
FIG. 9 is a block diagram illustrating a computer system architecture in accordance with exemplary embodiments.

FIG. 9 is a block diagram illustrating a computer system architecture in accordance with exemplary embodiments.

For example, the processing server 102 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 5-7, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for generating and using indexing models for neighborhood growth. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for indexing economic impact of weather events, comprising:

communicating, by a receiving device of a processing server, with a payment network via payment rails associated with the payment network to securely receive data related to a plurality of electronic payment transactions;

storing, in a transaction database of the processing server, a plurality of transaction data entries, wherein each transaction data entry is a structured data set including data, received from the payment network, related to a particular electronic payment transaction, from the plurality of electronic payment transactions, including at least a geographic location, a time and/or date, and transaction content data;

receiving, by the receiving device of the processing server, from a weather data provider, a data signal superimposed with weather data, wherein the weather data includes at least weather information for a geographic area for a plurality of time periods;

executing, by a querying module of the processing server, a query on the transaction database to identify a subset of transaction data entries where each transaction data entry in the subset includes a time and/or date included one or more transaction time periods respectively corresponding to the respective time period and where the geographic location included in each transaction data entry in the subset is included in the geographic area;

identifying, by an analytical module of the processing server, one or more purchase behaviors for each of the transaction time periods based on at least the transaction content data included in each transaction data entry in the subset of transaction data entries identified for the transaction time periods;

determining, by the processing server, a first deviation from a calculated weather baseline for the weather information for the geographic area over the plurality of time periods;

determining, by the processing server, a second deviation from corresponding one or more purchase behaviors and calculating, by an indexing module of the processing server, an index value associated with the geographic area indicative of an economic impact of weather events on the geographic area based on at least the first determined deviation and the second determined deviation.

2. The method of claim 1, further comprising:
receiving, by the receiving device of the processing server, a data signal superimposed with additional weather data, the additional weather data including weather information for a plurality of additional geographic areas for the plurality of time periods; and
repeating, for each of the plurality of additional geographic areas, the executing and identifying steps.

3. The method of claim 2, wherein the index value associated with the geographic area is further based on changes in the weather information for each of the plurality of additional geographic areas over the plurality of time periods and changes in the corresponding one or more purchase behaviors over the transaction time periods.

4. The method of claim 2, further comprising:
receiving, by the receiving device of the processing server, a data signal superimposed with demographic data, wherein the demographic data includes demographic information for the geographic area and each of the plurality of additional geographic areas, wherein the index value associated with the geographic area is further based on changes in the weather information for one or more of the plurality of additional geographic areas where the associated demographic information corresponds to the demographic information for the geographic area over the transaction time periods and changes in the corresponding one or more purchase behaviors over the transaction time periods.

5. The method of claim 4, wherein the demographic information includes at least one of: household income, type of household, income equality, age, occupation, education, and presence of children.

6. A method for estimating economic impact based on weather, comprising:
communicating, by a receiving device of a processing server, with a payment network via payment rails associated with the payment network to securely receive data related to a plurality of electronic payment transactions;

storing, in a transaction database of the processing server, a plurality of transaction data entries, wherein each transaction data entry is a structured data set including data, received from the payment network, related to a particular electronic payment transaction, from the plurality of electronic payment transactions, including at least a geographic location, a time and/or date, and transaction content data;

storing, in an index database of the processing server, a plurality of index values, wherein each index value is associated with one or more geographic areas, and wherein said processing server calculates each index value, from the plurality of index values, based on at least (i) a first deviation determined from a calculated weather baseline for weather information for a respective geographic area over a plurality of time periods, and (ii) a second deviation determined from one or more purchasing behaviors;

receiving, by a receiving device of the processing server, from a weather provider, a data signal superimposed with weather data, wherein the weather data includes weather information for a specific geographic area for a period of time;

executing, by a querying module of the processing server, a query on the transaction database to identify a subset of transaction data entries where the geographic location is included in the specific geographic area and where the time and/or date is included in a transaction time period corresponding to the period of time;

executing, by the querying module of the processing server, a query on the index database to identify, from the plurality of index values, a specific index value associated with the specific geographic area;

identifying, by an analytical module of the processing server, one or more purchase behaviors for transaction time period based on at least the transaction content data included in each transaction data entry in the subset of transaction data entries; and estimating, by the analytical module of the processing server, an economic impact for the specific geographic area based on at least the specific index value, the identified one or more purchase behaviors, and the weather information for the specific geographic area and the period of time.

7. The method of claim 6, further comprising:
electronically transmitting, by a transmitting device of the processing server, a data signal superimposed with at least the estimated economic impact for the specific geographic area.

8. The method of claim 7, further comprising:
receiving, by the receiving device of the processing server, a data signal superimposed with an economic impact request, wherein the economic impact request includes at least the specific geographic area, wherein the data signal superimposed with the estimated economic impact is electronically transmitted in response to the received data signal.

9. The method of claim 7, wherein the data signal is electronically transmitted to a display device for display of the estimated economic impact to a user of a computing device.

10. The method of claim 6, wherein
each index value is associated with one or more geographic areas having commonly associated demographic information, and
the specific index value is identified based on a correspondence between demographic information associated with the specific geographic area and the demographic information associated with the specific index value.

11. A system for indexing economic impact of weather events, comprising:
a receiving device, of a processing server, configured to (i) communicate with a payment network, via payment rails associated with the payment network, to securely receive data related to a plurality of electronic payment transactions, and (ii) receive a data signal, from a weather data provider, superimposed with weather data, wherein the weather data includes at least weather information for a geographic area for a plurality of time periods;
a transaction database, of the processing server, configured to store a plurality of transaction data entries, wherein each transaction data entry is a structured data set including data, received from the payment network, related to a particular electronic payment transaction, from the plurality of electronic payment transactions, including at least a geographic location, a time and/or date, and transaction content data;
a querying module, of the processing server, configured to execute a query on the transaction database to identify a subset of transaction data entries for each of the plurality of time periods where each transaction data entry in the subset includes a time and/or date included one or more transaction time periods respectively corresponding to the respective time period and where the geographic location included in each transaction data entry in the subset is included in the geographic area;
an analytical module, of the processing server, configured to identify one or more purchase behaviors for each of the transaction time periods based on at least the transaction content data included in each transaction data entry in the subset of transaction data entries identified for the transaction time periods;
a processing device, of the processing server, configured to determine (i) a first deviation from a calculated weather baseline for the weather information for the geographic area over the plurality of time periods, and (ii) a second deviation from corresponding one or more purchase behaviors over the transaction periods; and
an indexing module, of the processing server, configured to calculate an index value associated with the geographic area indicative of an economic impact of weather events on the geographic area based on at least the first deviation and the second deviation.

12. The system of claim 11, wherein
the receiving device of the processing server is further configured to receive a data signal superimposed with additional weather data, the additional weather data including weather information for a plurality of additional geographic areas for the plurality of time periods, and
the querying module, analytical module, and indexing module are further configured to repeat the executing and identifying steps are repeated for each of the plurality of additional geographic areas.

13. The system of claim 12, wherein the index value associated with the geographic area is further based on changes in the weather information for each of the plurality of additional geographic areas over the plurality of time periods and changes in the corresponding one or more purchase behaviors over the transaction time periods.

14. The system of claim 12, wherein
the receiving device of the processing server is further configured to receive a data signal superimposed with demographic data, wherein the demographic data includes demographic information for the geographic area and each of the plurality of additional geographic areas, and
the index value associated with the geographic area is further based on changes in the weather information for one or more of the plurality of additional geographic areas where the associated demographic information corresponds to the demographic information for the geographic area over the transaction time periods and changes in the corresponding one or more purchase behaviors over the transaction time periods.

15. The system of claim 14, wherein the demographic information includes at least one of: household income, type of household, income equality, age, occupation, education, and presence of children.

16. A system for estimating economic impact based on weather, comprising:
a receiving device, of a processing server, configured to (i) communicate with a payment network via payment rails associated with the payment network to securely receive therefrom data related to a plurality of electronic payment transactions, and (ii) receive a data signal, from a weather data provider, superimposed with weather data, wherein the weather data includes weather information for a specific geographic area for a period of time;
a transaction database, of the processing server, configured to store a plurality of transaction data entries, wherein each transaction data entry is a structured data set including data, received from the payment network, related to a particular electronic payment transaction, from the plurality of electronic payment transactions, including at least a geographic location, a time and/or date, and transaction content data;
an index database, of the processing server, configured to store a plurality of index values, wherein each index value is associated with one or more geographic areas, said processing server calculates each index value, from the plurality of index values, based on at least (i) a first deviation determined from a calculated weather baseline for weather information for a respective geographic area over a plurality of time periods, and (ii) a second deviation determined from one or more purchasing behaviors;
a querying module, of the processing server, configured to execute a query on the transaction database to identify a subset of transaction data entries where the geographic location is included in the specific geographic area and where the time and/or date is included in a transaction time period corresponding to the period of time, and
execute a query on the index database to identify, from the plurality of index values, a specific index value associated with the specific geographic area; and an analytical module of the processing server configured to
identify one or more purchase behaviors for the transaction time period based on at least the transaction content data included in each transaction data entry in the subset of transaction data entries, and
estimate an economic impact for the specific geographic area based on at least the specific index value, the identified one or more purchase behaviors, and the weather information for the specific geographic area and the period of time.

17. The system of claim 16, further comprising:
a transmitting device of the processing server configured to electronically transmit a data signal superimposed with at least the estimated economic impact for the specific geographic area.

18. The system of claim 17,
wherein the receiving device of the processing server is further configured to receive a data signal superimposed with an economic impact request, wherein the economic impact request includes at least the specific geographic area, and
the data signal superimposed with the estimated economic impact is electronically transmitted in response to the received data signal.

19. The system of claim 17, wherein the data signal is electronically transmitted to a display device for display of the estimated economic impact to a user of a computing device.

20. The system of claim 16, wherein
each index value is associated with one or more geographic areas having commonly associated demographic information, and
the specific index value is identified based on a correspondence between demographic information associated with the specific geographic area and the demographic information associated with the specific index value.

* * * * *